Oct. 6, 1953 J. JONAS 2,654,552
MOVABLE JET DEFLECTOR TO COMPENSATE FOR
DESTABILIZING MOMENT IN A JET AIRCRAFT
Filed Feb. 24, 1948 3 Sheets-Sheet 1

INVENTOR.
JULIUS JONAS
BY
Herbert E. Metcalf
Attorney

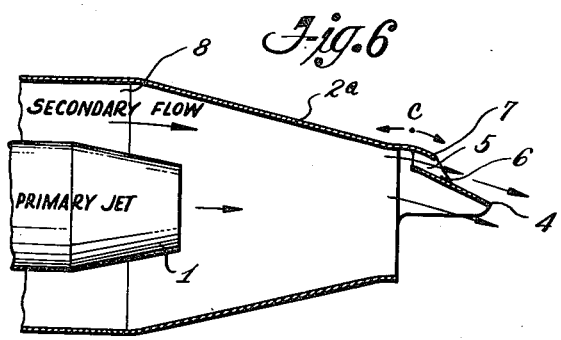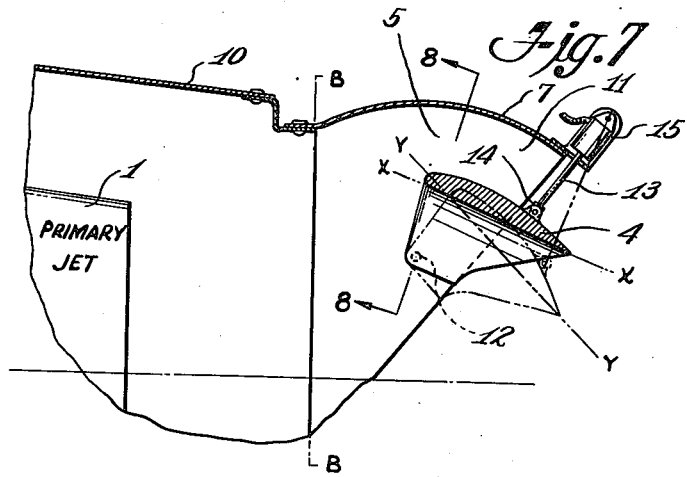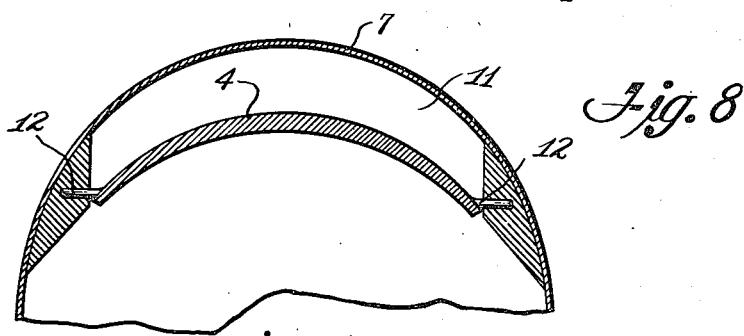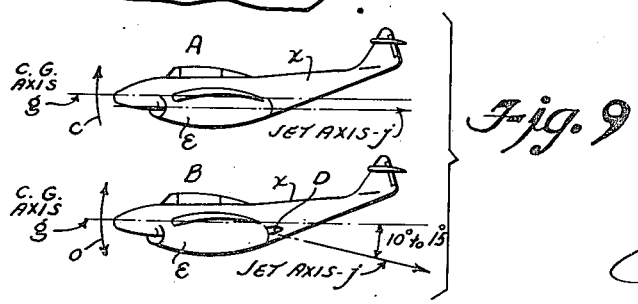

Oct. 6, 1953  J. JONAS  2,654,552
MOVABLE JET DEFLECTOR TO COMPENSATE FOR
DESTABILIZING MOMENT IN A JET AIRCRAFT
Filed Feb. 24, 1948  3 Sheets-Sheet 3

INVENTOR:
Julius Jonas

By Herbert E. Metcalf
His Patent Attorney

Patented Oct. 6, 1953

2,654,552

UNITED STATES PATENT OFFICE 2,654,552

MOVABLE JET DEFLECTOR TO COMPENSATE FOR DESTABILIZING MOMENT IN A JET AIRCRAFT

Julius Jonas, Los Angeles, Calif., assignor to Northrop Aircraft, Inc., Hawthorne, Calif., a corporation of California Application February 24, 1948, Serial No. 10,520

6 Claims. (Cl. 244—52)

My invention relates to jet deflectors and more particularly, to a means and method of effecting the deflection of a jet without incurring unsatisfactory flow conditions. This means and method may, for example, be used in conjunction with the deflection of a jet issuing from a turbojet engine.

Many modern airplanes are driven by turbojet engines whose aftward discharging jets produce a forward thrust along the axis of the engine.

In single or multiple jet engine installations, as a rule, the arrangement of the engines is such that the sum of the moments of all thrust forces about the airplane's center of gravity is zero.

In many instances, however, it is not convenient to mount the turbojet engines in the airplane so as to attain a zero moment configuration. Configurational considerations often conspire to make it desirable to displace the jet axes below the horizontal reference plane passing through the C. G. of the airplane, thus producing a destabilizing pitching moment which must be compensated for by additional horizontal tail surface area or increased tail moment arm, resulting in a performance penalty of the airplane.

In such cases, a small deflector vane placed on the nozzle exit of the exhaust pipe—usually on the top portion thereof—can be utilized to deflect the jet to the extent of causing the jet force to pass either through the C. G. of the airplane or as close to it as acceptable from stability and control considerations.

However, when this is done the effective tail pipe area is restricted, and furthermore a back pressure is produced at the base of the deflector, both of these factors upsetting the proper operation of the jet engine.

Accordingly, it is an object of the present invention to provide a means and method of deflecting a jet issuing from a nozzle without causing substantial reduction in the nozzle exit area and without creating any substantial back pressure in the jet.

I have found that such an object can be attained by venting a portion of the jet gas to a region of lower pressure at or near the points where the jet direction is changed. In this case, the deflector causes a deflection of the jet without necessarily restricting the effective tailpipe exit area. Thus, in the case of a turbojet installation the vented deflector, if installed at the end of the tailpipe nozzle, particularly if the nozzle is vented into the atmosphere directly, will permit the deflection of the jet without upsetting engine operation because the effective nozzle exit area can be effectively controlled by the selection of a proper vent area. It is obvious in this case that the location of the deflector assembly at the end of the tailpipe can be brought about either by mounting it directly on the tailpipe or on surrounding structure.

Again, it has almost become standard procedure to surround the tailpipe with an outer conduit sometimes referred to as a "shroud," which extends past the jet nozzle, thus forming the mixing section of a "jet pump" which aspirates cooling air through the space formed by the shroud and tailpipe thereby keeping the surrounding structure from becoming excessively hot.

When no deflector is used, the jet will properly issue from the exhaust system and aspirate the amount of cooling air commensurate with the design. However, I have found that when a plain deflector is placed at the exit of the outer conduit formed by the shroud, extending into the jet issuing from the jet pipe nozzle, sufficient back pressure is produced at the base of the deflector not only to reduce the aspirated cooling flow to zero but also, even in this case, sufficient to cause a partial reversal of the main jet, thereby forcing a portion of the jet to flow back into the annular space formed by the tailpipe and the outer shroud conduit. This not only causes structural overheating, but again upsets the proper operation of the jet engine.

Another object of the present invention is to provide a means and method of providing a substantially uninterrupted secondary flow and unimpeded engine operation, even though the jet is deflected, when a cooling shroud is used around the jet tailpipe.

In as much as there are many instances during airplane control when it may be desirable to change the pitching moment, it may also be desirable to change the pitching moment by changing the angle of jet thrust application. In consequence, I may make the deflector movable to obtain different jet deflection angles. As changing the angle of deflecting surface will change the effective jet exit area it is another object of the present invention to provide a means and method of varying both the jet deflection angle and the vent area to provide a substantially constant effective jet exit area.

When any considerable amount of jet flow is vented, some thrust is produced by the vented gas. In some cases it may also be desirable to deflect the vented gas and it is still another object of my invention to provide a jet deflector in which substantially all of the jet flow is deflected without substantial reduction of jet exit area.

In broad terms as to method, the present invention comprises deflecting a jet flow as it issues from a nozzle, and eliminating adverse back pressure and maintaining substantially full exit area for the jet, by venting a portion of the jet to a region of lower pressure at the area where directional change of the jet occurs.

In broad terms as to apparatus, my invention comprises a jet pipe with a deflector vane extending into the flow issuing from the pipe. Relief openings are positioned at the base of the deflector to vent some of the flow to prevent the build-up of adverse back pressures in that region.

My invention can be more readily understood by reference to the following description of a preferred embodiment thereof, and to the accompanying drawings in which Figure 1 is a diagram, representative of the prior art, of a jet nozzle exhausting into the atmosphere.

Figure 6 is a diagram showing the present invention as applied to a primary jet positioned to create a secondary flow.

Figure 7 is a longitudinal sectional view, partly diagrammatic, of a jet nozzle equipped with a movable vane.

Figure 8 is a cross sectional view taken as indicated by line 8—8 in Figure 7.

Figure 9 shows two diagrams illustrating how a destabilizing moment caused by jet engine installation below the horizontal reference plane passing through the C. G. of the airplane can be compensated for by jet deflection.

Figure 1:
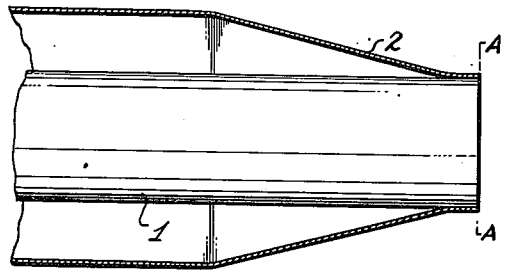

Referring first to the configuration shown in Figure 1, the jet pipe 1 represents, for example, the tailpipe of a turbojet engine having a nozzle exit area A—A.

Figure 2:
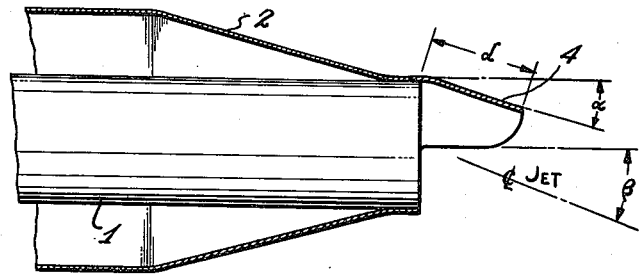
Figure 2 is a diagram showing the attachment of a jet deflecting vane to the nozzle of Figure 1.

If it is desired to deflect the outcoming jet flow issuing from such a system, as explained above, a deflecting surface may be positioned at the nozzle exit, as shown in Figure 2. The deflector vane may be attached to the tailpipe 1 if it is sufficiently strong or to surrounding structure 2. Here a deflector vane 4 can be placed at an angle $\alpha$ to the horizontal, projecting into the jet flow. By selecting a proper value of vane chord length L and vane angle $\alpha$, any desired jet deflection angle $\beta$ can be obtained, so that the centerline ₵ of the jet will have been rotated into the proper direction, for example, to improve longitudinal stability, as pointed out above.

Figure 3:
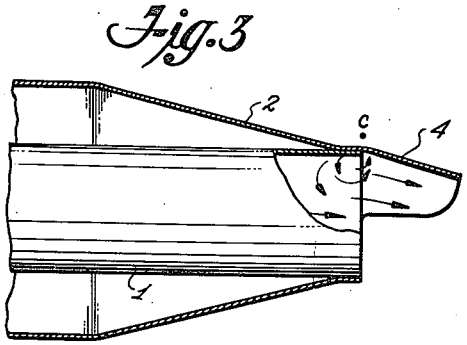
Figure 3 is a diagram showing where back pressure develops at the base of the plain deflecting vane.
Figure 4:
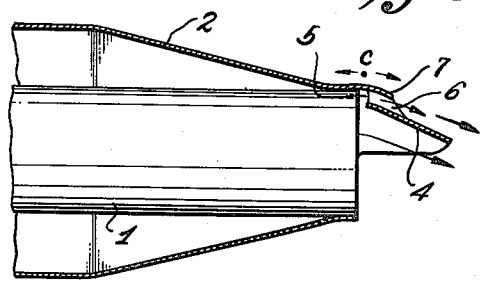
Figure 4 is a diagram showing gas flow with relief openings at the base of the deflecting vane.

However, I have found that when any vane angle $\alpha$ is used in excess of a few degrees, sufficient back pressure is produced at the base of the deflecting surface in the region of point C, as shown in Figure 3, to cause an effective reduction of nozzle exit area, with consequent reduction of thrust. To overcome this difficulty and still maintain the inherent simplicity of the deflecting surface, I provide a relief opening 5 at region C where the deflection starts, as shown in Figure 4. If a proper magnitude of the relief opening 5 is selected, it is possible to skim off part of the jet to the extent of practically eliminating the adverse back pressure in region C. Yet, practically all of the primary jet is forced to flow along the angle of the deflector surface 4, giving the desired jet deflection without the above mentioned reversal of part of the jet.

Figure 5:
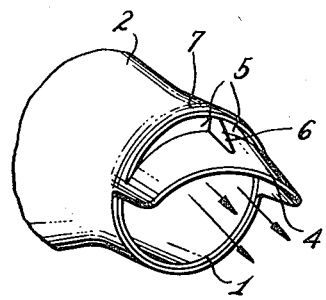
Figure 5 is a perspective view of a jet outlet equipped with one aspect of a deflector vane made in accordance with the present invention.

In Figure 5 a perspective view is shown of one form of a tested deflector system embodying the present invention. Here the deflector vane 4 extends over about one half of the outer conduit 2 periphery, the vane being symmetrically located about the vertical axis passing through the exhaust opening of the tailpipe. It is approximately circular with a larger radius than the conduit to provide the upper relief opening 5 divided by a deflector vane supporting strut 6.

It will be noted that in the device illustrated in Figures 4 and 5, that portion of the jet issuing through the vent openings 5 is also deflected by extending the top half of the conduit 2 above the combined flow exit and giving that extension 7 a downward angle corresponding to the deflector angle $\alpha$. In this way, the proper thrust angle is also obtained in the vent flow. This relatively small flow does not cause sufficient back pressure to interfere with engine operation. However, when the vent flow is still smaller, it may be directed in line with the original jet, or, if larger, it may be deflected along with the jet with additional dividing vanes placed between the deflecting vane 4 and deflecting extension 7 to prevent turbulence in the skimmed-off flow. In any event, a portion of the jet flow is vented to the atmosphere adjacent to the base of the main deflector vane.

The deflector of the present invention is equally satisfactory for installations where a shroud 2$a$ is used around the primary jet pipe and extended beyond the end of the jet pipe to cause a jet pump action aspirating a secondary cooling airflow through a space 8 between the primary jet pipe and the shroud. In this case, the deflector 4 is placed on the end of the shroud and if a plain deflector were to be used a back pressure would be developed sufficient to cause a reversal of the secondary flow.

In this instance also, the vent 5 placed at the base of the deflector, as shown in Figure 6, will eliminate the reversal of the secondary flow, restore the proper exit area, and permit proper engine operation even though the jet is deflected.

In this manner, by selection of the proper relief opening, the same, less, or more secondary cooling airflow can be obtained with the deflector as when no deflector is used.

I do not wish to be limited to the application of my invention to a fixed deflecting vane because the same results are obtainable when the deflector vane angle is adjustable or controllable, as might be desirable so as to attain airplane control apart from use of airplane control surfaces for that purpose, for example. One such an arrangement is shown in Figures 7 and 8.

One arrangement that has proved satisfactory for this purpose is shown in Figures 7 and 8.

Here a shroud 10 is concentrically placed around the tailpipe 1 and extends beyond it to provide a combined flow exit area B—B. In this case, the deflecting vane 4 is of airfoil section and is positioned at the desired angle, the vane being symmetrically located about the vertical axis passing through the exhaust opening of the tailpipe. Vent opening 5 is provided between the leading edge of the deflector and the shroud, and the vent extension 7 is extended aft to terminate in substantially the same plane as the trailing edge of the deflector vane 4 to provide a relief duct 11 between vane and extension. Extension 7 is curved to deflect the vented flow.

For a normal deflection the vane 4 is preferably positioned along line X—X so that the top contour of vane 4 is substantially parallel with the curve of extension 7.

However, as pointed out above, it may be desirable to rotate vane 4 to achieve varying deflection angles. In this case, vane 4 at its lower ends is rotatably attached to shroud 10 as by pivot pins 12, and an actuating rod 13 is attached to, for example, the rear third of vane 4 by fitting 14. Rod 13 is actuated by actuator 15 of any convenient type, such as, an electrical screw jack for example. Operation of actuator 15 will move vane 4 on pivot pins 12 as shown by dotted outline into position Y—Y, for example, thus changing the jet deflection angle. At the same time, the leading edge of vane 4 has moved rearwardly thus increasing vent area 5 to compensate for the decreased effective area below the vane 4. Likewise, movement of the vane upwardly to decrease the deflection angle will reduce the vent area somewhat, but this is not as important, as movement upwardly does not reduce the effective exit area but increases it. I have found that for pitch control purposes it is not necessary to change the angle of the extension 7 although that also can be accomplished by similar pivoting and control if desired.

Figure 10:
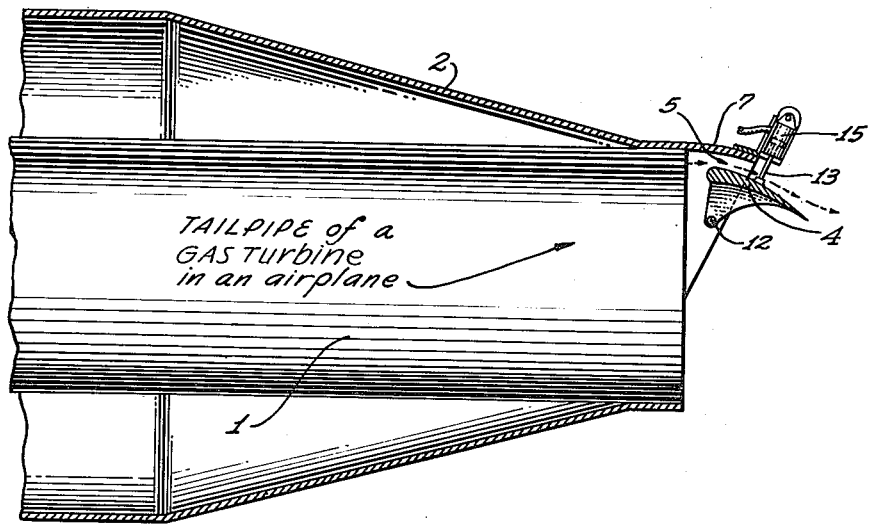
Figure 10 is a diagram illustrating another embodiment of the invention.

It will be clear to those skilled in the art that the embodiment shown in Figures 7 and 8 can be applied either to a straight jet as illustrated in Figure 10, or a jet arranged to create a secondary flow.

In Figure 9, diagrams A and B show the effect of jet deflection in an airplane X having the twin jet engines E symmetrically mounted with their jet axes below the horizontal longitudinal axis passing through the C. G. of the airplane.

In diagram A, no jet deflectors are used, and the jet axis j is parallel with the C. G. axis g. This produces a climbing moment on the airplane as indicated by arrow C. When a deflector assembly D, such as that shown, for example, in Figure 7, is used on each jet exhaust with a deflection angle of from 10°–15°, as shown in diagram B, the climbing moment will be opposed by a diving moment produced by jet deflection as indicated by opposed arrows O.

What is claimed is:

1. In an airplane driven by a jet of hot gases directed rearwardly through an exhaust opening of the tailpipe of a gaseous combustion turbine engine, said jet located so as to produce a destabilizing moment on said airplane when in flight, a deflection vane having a basal portion positioned adjacent to and symmetrically located about the vertical axis passing through said exhaust opening to provide a vent for a portion of said gases between said basal portion and an edge of said opening, the remainder of said vane extending outwardly beyond said opening and toward the axis of said tailpipe to intersect and deflect at least a portion of the gas passing through said opening; said vane being rotatable about a pivot to change the angle of inclination of said vane with respect to the axis of said tailpipe, said vane being positioned with reference to said pivot to increase the vent area with an increased deflection angle of said vane, whereby the deflection of said gases is changed without substantially changing the total effective exit area; said vane having one deflected position creating a moment on said airplane opposed to and substantially compensating for said destabilizing moment; and an extension member projecting rearwardly from the tailpipe opening toward the axis of said tailpipe and spaced from said vane to provide a passage therebetween for the vented gases, said passage being inclined toward the axis of said tailpipe.

2. Apparatus in accordance with claim 1, wherein said edge of said opening is substantially circular, and said basal portion has circular contours of greater radius than that of said edge to provide a vent of crescent shape between said basal portion and the adjacent edge of said pipe nozzle.

3. Apparatus in accordance with claim 1, wherein said edge of said opening is substantially circular, and said basal portion has circular contours of greater radius than that of said edge to provide a vent of crescent shape between said basal portion and the adjacent edge of said pipe nozzle, and wherein the longitudinal cross section of the vane is in the form of an airfoil section.

4. In an airplane driven by a jet of hot gases directed rearwardly through an exhaust opening of the tailpipe of a gaseous combustion turbine engine, said jet located so as to produce a destabilizing moment on said airplane when in flight, a shroud of substantially circular section concentrically positioned around said tailpipe and open to the atmosphere at an upstream location of said shroud, said shroud extending rearwardly beyond said exhaust opening to create a negative pressure between said shroud and said opening, thereby creating a cooling air flow between said shroud and said tailpipe; a deflector vane mounted near the end of said shroud and extending beyond the opening of said shroud and having a basal portion positioned adjacent to the opening of said shroud to provide a vent for a portion of said gases between said basal portion and the edge of the opening of said shroud, the remainder of said vane extending outwardly beyond the edge of said shroud opening and toward the axis of the tailpipe to intersect and deflect at least a portion of the gas issuing from said exhaust opening; said vane being rotatable about a pivot to change the angle of inclination of said vane with respect to the axis of said tailpipe, said vane being positioned with reference to said pivot to increase the vent area with an increased deflection angle of said vane, whereby the deflection of said gases is changed without substantially changing the total effective nozzle exit area; said vane having one deflected position such as to create a jet deflection producing a moment on said airplane opposing said destabilizing moment; and an extension member projecting rearwardly from said shroud toward the axis of said tailpipe and spaced from said vane to provide a passage therebetween for the vented gases, said passage being inclined toward the axis of said tailpipe.

5. Apparatus in accordance with claim 4, wherein said vane has circular contours in the same sense as the contour of the end edge of said shroud, but with substantially greater radii of curvature to provide a crescent shaped vent in the path of the cooling air passing between said shroud and tailpipe.

6. Apparatus in accordance with claim 4, wherein said vane has circular contours in the same sense as the contour of the end edge of said shroud, but with substantially greater radii of curvature to provide a crescent shaped vent, and wherein the longitudinal cross section of the vane is in the form of an airfoil section.

JULIUS JONAS.

References Cited in the file of this patent

UNITED STATES PATENTS

| Number | Name | Date |
| --- | --- | --- |
| 1,572,812 | Rees | Feb. 9, 1926 |
| 1,798,141 | Chillingworth | Mar. 31, 1931 |
| 1,888,214 | Bogstrand | Nov. 22, 1932 |
| 2,345,672 | Howse | Apr. 4, 1944 |
| 2,420,323 | Meyer et al. | May 13, 1947 |
| 2,481,330 | Neal | Sept. 6, 1949 |
| 2,491,610 | Goddard | Dec. 20, 1949 |
| 2,518,697 | Lee | Aug. 15, 1950 |

FOREIGN PATENTS

| Number | Country | Date |
| --- | --- | --- |
| 592,756 | Great Britain | Sept. 29, 1947 |